(12) United States Patent
Fang et al.

(10) Patent No.: US 11,232,547 B2
(45) Date of Patent: *Jan. 25, 2022

(54) HIERARCHICAL SCALE MATCHING AND PATCH ESTIMATION FOR IMAGE STYLE TRANSFER WITH ARBITRARY RESOLUTION

(71) Applicant: Adobe Inc., San Jose, CA (US)

(72) Inventors: Chen Fang, Sunnyvale, CA (US); Zhe Lin, Fremont, CA (US); Zhaowen Wang, San Jose, CA (US); Yulun Zhang, Somerville, MA (US); Yilin Wang, Sunnyvale, CA (US); Jimei Yang, Mountain View, CA (US)

(73) Assignee: Adobe Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/930,736

(22) Filed: Jul. 16, 2020

(65) Prior Publication Data

US 2020/0349688 A1 Nov. 5, 2020

Related U.S. Application Data

(63) Continuation of application No. 16/271,058, filed on Feb. 8, 2019, now Pat. No. 10,769,764.

(51) Int. Cl.
*G06T 11/00* (2006.01)
*G06T 5/50* (2006.01)
(Continued)

(52) U.S. Cl.
CPC .............. *G06T 5/50* (2013.01); *G06T 3/0012* (2013.01); *G06T 3/40* (2013.01); *G06T 7/11* (2017.01);
(Continued)

(58) Field of Classification Search
CPC ...... G06T 5/50; G06T 3/40; G06T 7/11; G06T 11/001; G06T 3/0012; G06T 2207/20212; G06T 2207/20016; G06T 11/00
See application file for complete search history.

(56) References Cited

U.S. PATENT DOCUMENTS 10,929,676 B2 * 2/2021 Joze .......................... G06N 3/08
2017/0139572 A1 5/2017 Sunkavalli et al.
(Continued)

OTHER PUBLICATIONS

Efros et al., Image Quilting for Texture Synthesis and Transfer, 2001 (Year: 2001).*
Gatys et al., Controlling Perceptual Factors in Neural Style Transfer, 2017 (Year: 2017).*
Li et al., Universal Style Transfer via Feature Transforms, 2017 (Year: 2017).*
(Continued)

*Primary Examiner* — Phong X Nguyen
(74) *Attorney, Agent, or Firm* — Finch & Maloney PLLC

(57) ABSTRACT

A style of a digital image is transferred to another digital image of arbitrary resolution. A high-resolution (HR) content image is segmented into several low-resolution (LR) patches. The resolution of a style image is matched to have the same resolution as the LR content image patches. Style transfer is then performed on a patch-by-patch basis using, for example, a pair of feature transforms—whitening and coloring. The patch-by-patch style transfer process is then repeated at several increasing resolutions, or scale levels, of both the content and style images. The results of the style transfer at each scale level are incorporated into successive scale levels up to and including the original HR scale. As a result, style transfer can be performed with images having arbitrary resolutions to produce visually pleasing results with good spatial consistency.

17 Claims, 7 Drawing Sheets
(1 of 7 Drawing Sheet(s) Filed in Color)

(51) Int. Cl.
*G06T 3/40* (2006.01)
*G06T 7/11* (2017.01)
*G06T 3/00* (2006.01)

(52) U.S. Cl.
CPC .. *G06T 11/001* (2013.01); *G06T 2207/20016* (2013.01); *G06T 2207/20212* (2013.01)

(56) References Cited

U.S. PATENT DOCUMENTS

| | | | |
|---|---|---|---|
| 2017/0148222 A1 | 5/2017 | Holzer et al. | |
| 2018/0068463 A1* | 3/2018 | Risser | G06T 7/45 |
| 2018/0122047 A1 | 5/2018 | Wang et al. | |
| 2018/0204336 A1* | 7/2018 | Fang | G06T 7/40 |
| 2018/0285679 A1 | 10/2018 | Amitay | |
| 2018/0322662 A1 | 11/2018 | Hellier et al. | |
| 2018/0357514 A1* | 12/2018 | Zisimopoulos | G06N 3/0472 |
| 2019/0220746 A1 | 7/2019 | Liu et al. | |
| 2019/0244060 A1* | 8/2019 | Dundar | G06N 3/08 |
| 2019/0244329 A1* | 8/2019 | Li | G06N 3/084 |
| 2019/0259134 A1 | 8/2019 | Rainy | |
| 2019/0325628 A1 | 10/2019 | Dubey et al. | |
| 2020/0226724 A1* | 7/2020 | Fang | G06K 9/6232 |
| 2020/0242823 A1* | 7/2020 | Gehlaut | G06T 11/001 |
| 2020/0258204 A1* | 8/2020 | Fang | G06T 3/0012 |
| 2021/0012181 A1* | 1/2021 | Zhu | G06T 7/10 |

OTHER PUBLICATIONS

Risser et al., Stable and Controllable Neural Texture Synthesis and Style Transfer Using Histogram Losses, 2017 (Year: 2017).*
Xun Huang et al., Arbitrary Style Transfer in Real-time with Adaptive Instance Normalization, International Conference on Learning Representations (ICLR) (2017).
Yijun Li et al., Universal Style Transfer via Feature Transforms, 31st Conference on Neural Information Processing Systems (NIPS) (2017).
Shuyang Gu et al., Arbitrary Style Transfer with Deep Feature Reshuffle, Conference on Computer Vision and Pattern Recognition (CVPR) (2018).
Artsiom Sanakoyeu et al., A Style-aware Content Loss for Real-time HD Style Transfer. European Conference on Computer Vision (ECCV) (2018).
Chen et al., "Fast Patch-based Style Transfer of Arbitrary Style", 2016 (Year:2016).
Frigo et al., "Split and Match: Example-based Adaptive Patch Sampling for Unsupervised Style Transfer", 2016 (Year: 2016).
Elad et al., "Style Transfer via Texture Synthesis", 2017 (Year: 2017).
Jing et al., "Stroke Controllable Fast Style Transfer with Adaptive Receptive Fields", 2018 (Year: 2018).
Sheng et al., "Avatar-Net: Multi-scale Zero-shot Style Transfer by Feature Decoration", 2018 (Year: 2018).

* cited by examiner

HIERARCHICAL SCALE MATCHING AND PATCH ESTIMATION FOR IMAGE STYLE TRANSFER WITH ARBITRARY RESOLUTION

CROSS REFERENCE TO RELATED APPLICATIONS

This application is a continuation of U.S. application Ser. No. 16/271,058 filed on Feb. 8, 2019, which is hereby incorporated by reference in its entirety.

FIELD OF THE DISCLOSURE

This disclosure relates generally to the field of digital image processing, and more particularly, to techniques for automatically transferring a style of at least one image to another image.

BACKGROUND

Style transfer is a computer-implemented technique for altering the appearance of content in a digital image to simulate the artistic style in another digital image while preserving some notion of the original content. Artists spend a great amount of time and effort to compose artwork, such as paintings and photographs, that have a compelling style. Different styles will elicit different moods. For example, a high-contrast, black-and-white portrait may convey gravity, while a bright, colorful portrait will evoke a lighter atmosphere. Digital image editing applications can be used to transfer the style of one image to another. For instance, a specific use of color or contrast in one image can be applied to another image to mimic the color or contrast. In many instances, editing an image to achieve a compelling result involves maintaining a visually pleasing appearance while applying significant adjustments to the original image. Yet, the tolerance for errors is low because even certain small adjustments to the image can lead to undesirable results. Thus, advanced editing skills beyond the abilities of most casual artists are needed to produce such renditions.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The accompanying drawings are not intended to be drawn to scale.

DETAILED DESCRIPTION

Figure 1:
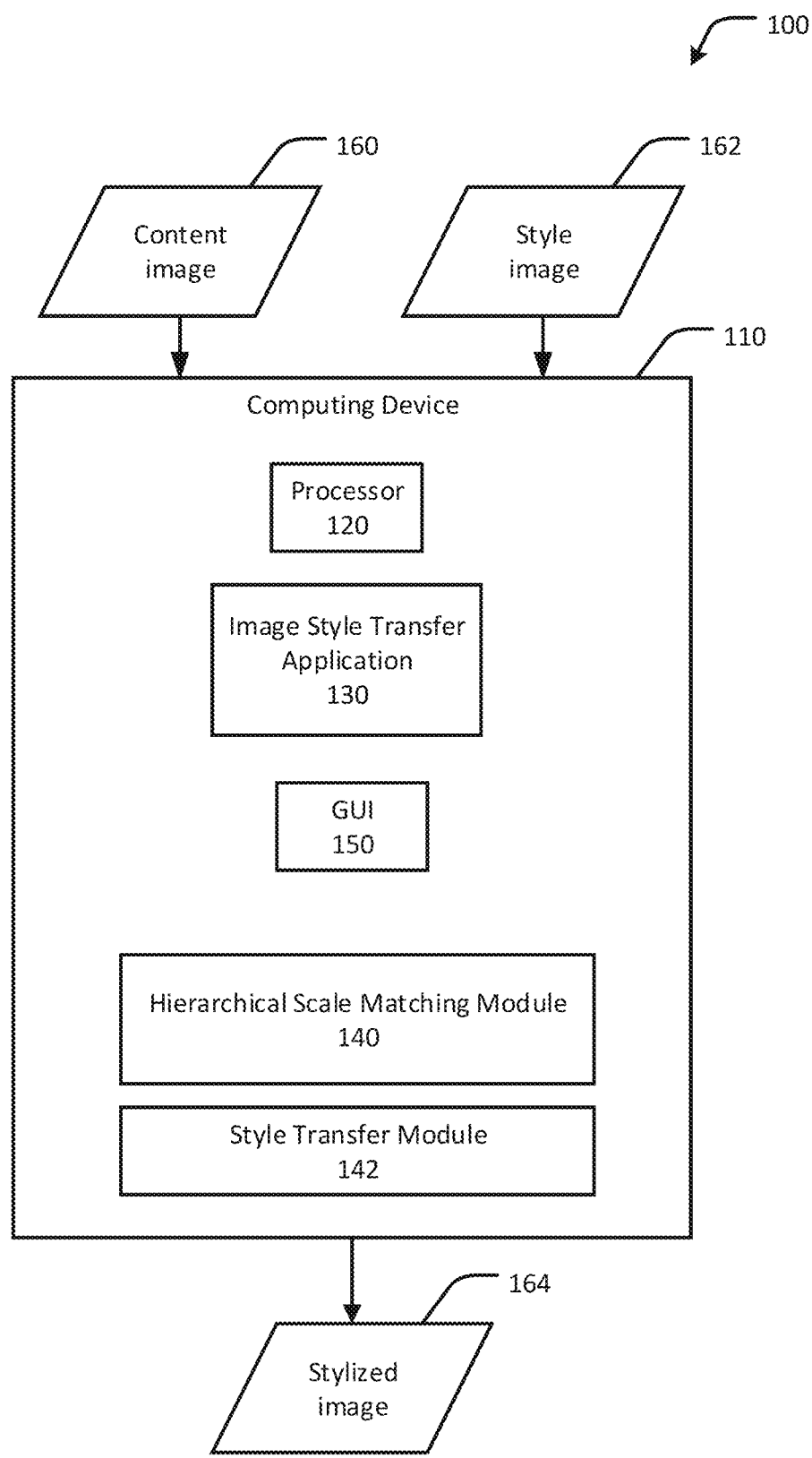
FIG. 1 shows an example system for transferring a style of a digital style image to a digital content image, in accordance with an embodiment of the present disclosure.

Various techniques such as statistical matching and neural networks, including convolution neural networks (CNN), have been used to transfer styles from one digital image to another. However, image style transfer for high-resolution content is difficult to directly process. There are a number of reasons for this. One reason is that almost all of the CNN-based style transfer methods cannot process large images due to limited memory and heavy computational time. To address this, a large image can be divided into several smaller regions, referred to as patches, and then the style transfer can be processed on a patch-by-patch basis. However, the results of most CNN-based methods suffer from spatial inconsistency, which tends to cause one patch of a given image to be processed differently than another patch of the given image. Thus, such patch-based style transfer tends to introduce undesirable distortions into the image, such as blurring, loss of structural information, and/or artifacts. Another reason that image style transfer for high-resolution content is difficult is that any mismatches between the scales, or resolutions, of the content and style images causes distortions or loss of patterns in the style effects of the resulting image. Moreover, and as noted above, transferring the style of high-resolution images using existing techniques is computationally expensive. While some existing techniques have attempted to address this problem, the results tend to be unpleasing to the artist or otherwise yield low quality results. Furthermore, the existing techniques are not adapted to handle images of arbitrary resolution. In other words, the results of style transfer using these existing techniques are inconsistent between images of differing resolutions.

To this end, and in accordance with an embodiment of the present disclosure, techniques for transferring styles with images of arbitrary resolution are disclosed. In an embodiment, a relatively high-resolution (HR) content image is segmented, or split, into two or more low-resolution (LR) patches. Each patch represents a portion of the whole image. For example, the content image can be divided into four patches that in combination form the whole image. Additionally, the resolution of a style image is matched to have the same resolution as the LR content image patches. Style transfer is then performed on a patch-by-patch basis using, for example, a pair of feature transforms—whitening and coloring. The patch-by-patch style transfer process is then repeated at several increasing resolutions, or scale levels, of both the content and style images. The resolutions of the content and style images are sufficiently matched at each scale level. The results of the style transfer at each scale level are incorporated into successive scale levels up to and including the original HR scale. As a result, style transfer can be performed with images having arbitrary resolutions to produce visually pleasing results with good spatial consistency.

In more detail, and according to one such embodiment, a computer-implemented method of transferring a style from a digital style image to a digital content image is disclosed. The content image is an original image that is to be modified in the style of the style image. After the content image is modified, the image retains much of the original content but incorporates the stylistic appearance of the style image. In other words, the stylistic appearance of the modified content image can include colors, textures, contrasts, or other visual aspects of the style image that are incorporated into the content image while the original content remains recognizable to an observer.

In accordance with one such embodiment, the method of transferring a style between images includes segmenting, or splitting, an original digital content image at a first content scale into a first plurality of patches at the first content scale, and then processing the style transfer on a patch-by-patch basis at the first content scale. The first content scale is a lower resolution than the resolution of the original, unmodified content image. For example, the original content image may have a resolution of 4K pixels, while the first content scale is 512, 1K or 2K pixels. As used in this disclosure, the terms 512 pixels, 1K pixels, 2K pixels, and 4K pixels, and other similar terms, refer to the horizontal display resolution of an image having approximately the corresponding number of pixels. For instance, an image with 4K pixels has a horizontal display resolution of approximately 4,000 pixels, such as found in an image having 3840×2160 pixels (ultra-high definition or UHD).

The method further includes transferring a style of a digital style image at a first style scale to each of the patches of the original digital content image at the first content scale, thereby providing a modified digital content image at the first content scale. As with the first content scale, the first style scale is a lower resolution than the resolution of the original, unmodified content image, and may also be a lower resolution than the resolution of the original style image. In some such cases, the first content scale is the same as the first style scale. For example, if the first content scale is 512 pixels, then the first style scale is also 512 pixels. In other example embodiments, a first content scale that is within a certain tolerance of the first style scale is considered to be the same scale, or substantially the same. The tolerance can vary from one embodiment to the next, but in some cases is 20%, or 10% or 5% or 2%, or 1%, to name a few examples. As will be appreciated in light of this disclosure, the greater the tolerance the greater the susceptibility of the style transfer process to inconsistencies. So, a trade with respect to scale and consistency, in such cases. As will be further appreciated, any number of style transfer techniques can be applied to each of the patches of the original digital image at the first content scale, including but not limited to a feature whitening and/or coloring scheme, as variously discussed in this disclosure.

After the style transfer process has completed for each of the patches of the original digital image at the first content scale, the methodology continues with upscaling the modified digital content image from the first content scale to a second content scale. The second content scale is greater than the first content scale, for example, by a factor of two. For example, if the first content scale is 512 pixels, then the second content scale is 1K pixels. In another example, if the first content scale is 1K pixels, the second content scale is 2K pixels. In yet another example, if the first content scale is 2K pixels, the second content scale is 4K pixels. Other embodiments may employ a different upscaling factor, as any number of other scale factors may be employed.

The methodology continues with combining the original digital content image, at the second scale, with the upscaled modified digital content image, also at the second scale. For example, if the upscaled modified digital content image is at a resolution of 1K pixels, then it is combined with the original digital content image at 1K pixels, or substantially close to 1K pixels (e.g., within 20% or 10% of 1K pixels, should non-standard or otherwise additional resolutions be available). In some such embodiments, if the original digital content image has a different resolution, then it is re-scaled to match the resolution of the upscaled modified digital content image. By combining the original, unmodified content image with the modified content image, the features generated by the style transfer are combined with the features generated by the whitening and color transform (or other desired style transfer processes).

Once the original and modified content images are combined, the methodology continues with segmenting the combined digital content image at the second content scale into a second plurality of patches and transferring the style of the digital style image at a second style scale to each of the patches of the combined digital content image at the second content scale. Similar to the style transfer discussed above, the second style scale is greater than the first style scale and can be the same resolution as the second content scale. This additional style transfer provides a modified digital content image at the second content scale, including the results of the style transfer that was performed at the first content scale.

In some embodiments, the process of transferring the style of the style image to the content image on a patch-by-patch basis can be repeated several times until the modified content image has been upscaled to the same resolution as the original content image. For example, when the original content image has a resolution of 4K pixels, then style transfer can be iteratively performed at 512 pixels, then at 1K pixels, then at 2K pixels, and then at 4K pixels to obtain a modified digital content image with the style of the digital style image. An output image with content of the modified digital content image at the second content scale in the style of the digital style image can then be generated or otherwise displayed.

System Architecture

FIG. 1 shows an example system 100 for transferring a style of a digital style image to a digital content image, in accordance with an embodiment of the present disclosure. The system 100 includes a computing device 110 having a processor 120, an Image Style Transfer Application 130, and a graphical user interface (GUI) 150. The GUI 150 includes a display and user input device. The processor 120 of the computing device 110 is configured to execute Hierarchical Scale Matching Module 140 and Style Transfer Module 142, each of which is described in further detail below. The computing device 110 is further configured to receive, as inputs, a digital content image 160 and a digital style image 162. The content image 160 can include an image of arbitrary resolution to be processed by the system 100. The computing device 110 is further configured to produce, as an output, a digital stylized image 164 that is based at least in part on content image 160 and the style image 162. The stylized image 164 is an image that retains the content of the content image 160 but with colors, textures, and/or other visual effects of the style image 162, such as variously described in this disclosure. Any number of standard or proprietary digital images (e.g., a JPEG image would be a typical example, although other image file types will be appreciated) can be used for digital content image 160 and digital style image 162.

Example Images

Figure 2:
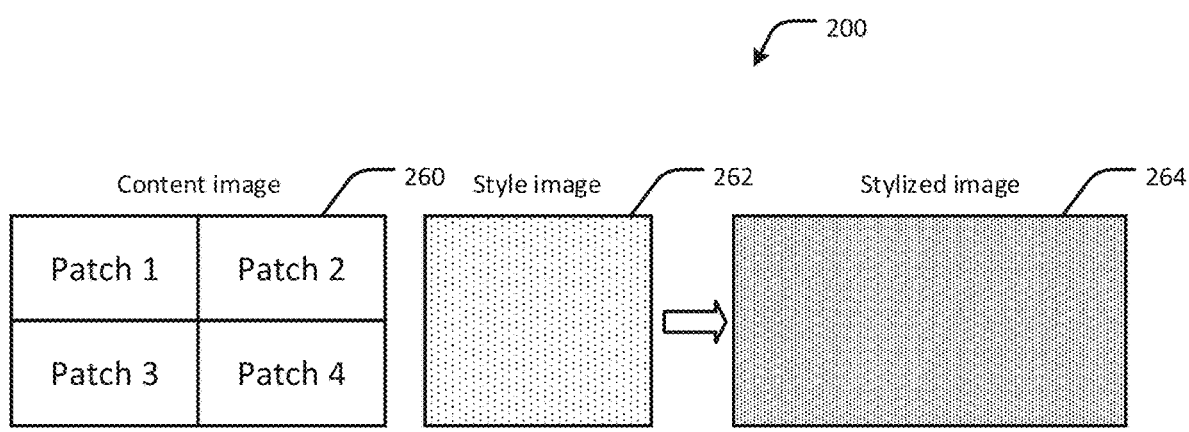
FIG. 2 shows example digital images in accordance with one or more embodiments of the present disclosure.
Figure 3:
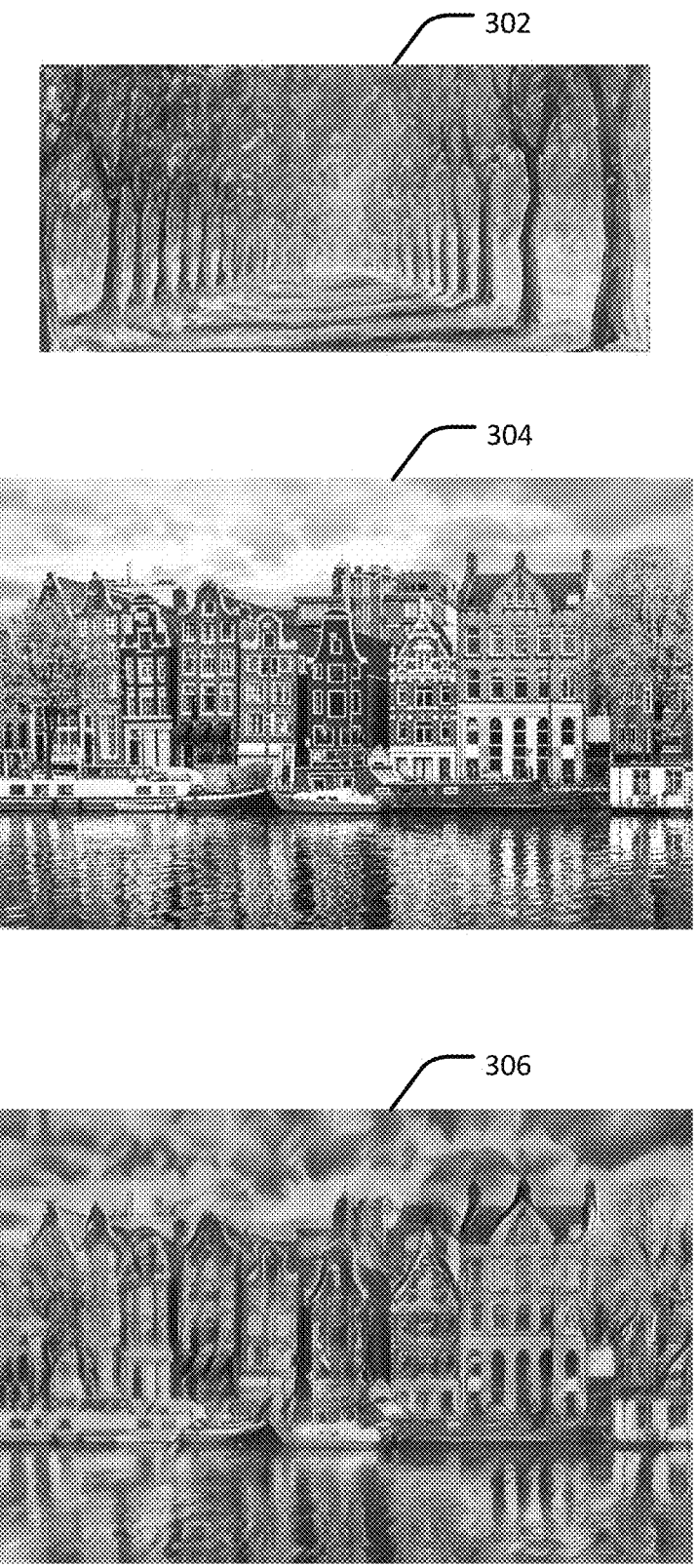
FIG. 3 shows three example stylized digital images that can be obtained in accordance with one or more embodiments of the present disclosure.

FIGS. 2 and 3 show example images 200. 302, 304 and 306, respectively, in accordance with one or more embodiments of the present disclosure. Images 200 include a representative digital content image 260, a representative digital style image 262, and a representative digital stylized image 264. For clarity, the images 200 are shown generically, although it will be understood that the stylized images typically include visual effects, such as shown in the stylized image examples of FIG. 3. The content image 260 is partitioned into several patches (in this example, four patches), each representing a portion of the whole image. The stylized image 264 is generated by transferring a style of the style image 262 to the content image 260 on a patch-by-patch basis at different scale levels using the hierarchical scale matching scheme disclosed herein.

Images 302, 304 and 306 are example digital stylized images that can be obtained using the techniques disclosed herein. The stylized images 302, 304 and 306 differ from the original content images in that, while the content of the content image is recognizable in the stylized image, the colors, textures, and other visual effects of the stylized image more closely match the visual effects of the style image than the visual effects of the content image. In this manner, the stylized image represents an artistic rendering of the original content that incorporates the style of an entirely different image.

Example Image Editing System

Figure 4:
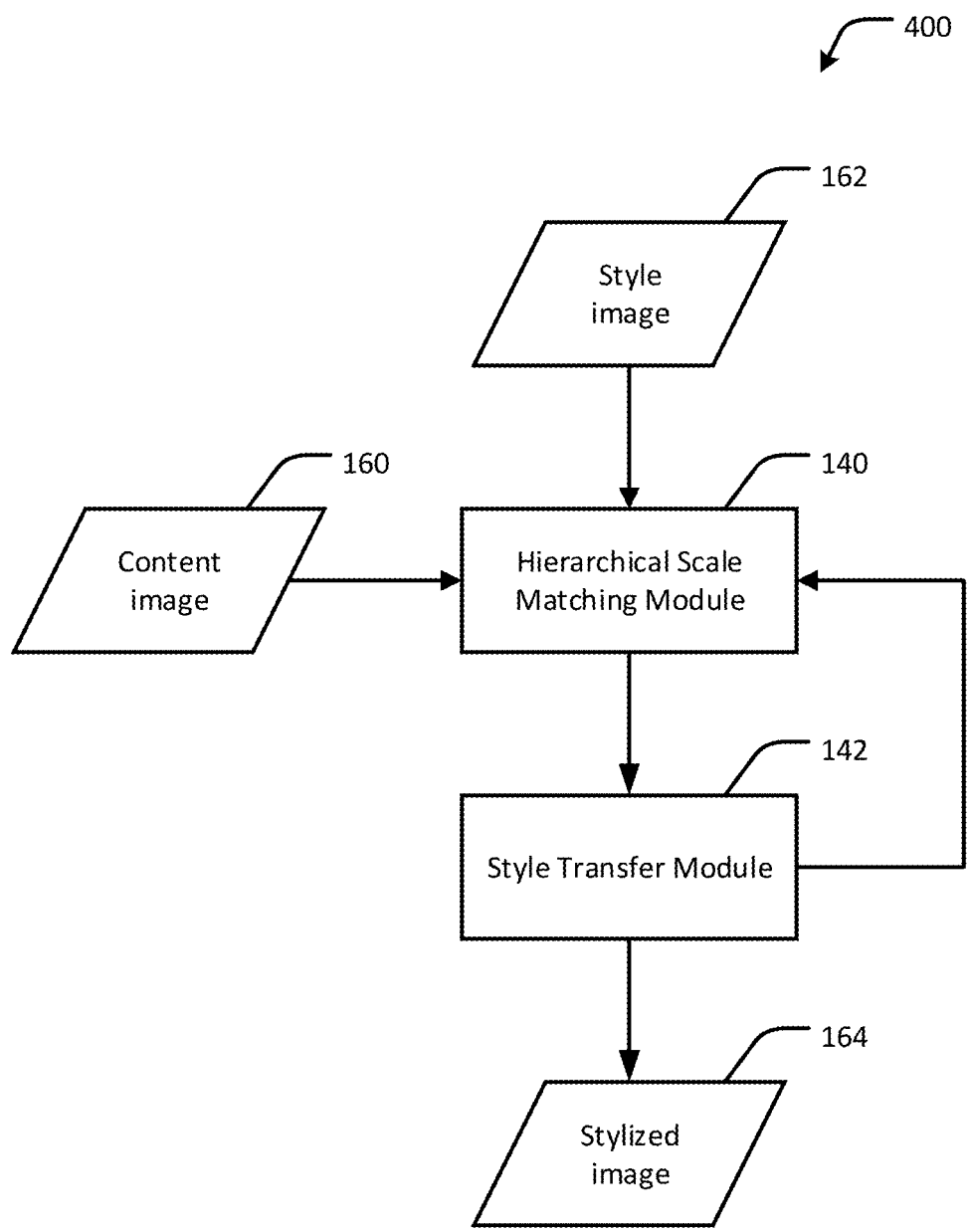
FIG. 4 shows another example system for transferring a style of a digital style image to a digital content image, in accordance with an embodiment of the present disclosure.

FIG. 4 is an example system 400 for transferring a style of a digital style image to a digital content image, in accordance with an embodiment of the present disclosure. In a more general sense, system 400 is for transferring a style of a first digital image to a second digital image. To this end, note that terms like "digital style image" to "digital content image" are used herein purposes of clarity and to provide a more intuitive reading experience, and are not intended to limit the type of images upon which the system can operate, as will be appreciated in light of this disclosure. In this example embodiment, the system 400 includes at least some of the elements of system 100 of FIG. 1, including the processor 120, the image style transfer application 130, the hierarchical scale matching module 140, and the style transfer module 142 of the computing device 110. However, for clarity, not all elements of the system 400 are necessarily shown.

System 400 receives the content image 160 and the style image 162 as inputs and generates the stylized image 164 as an output. The system 400 can receive the content image 160 and the style image 162 via, for example, the GUI 150 of FIG. 1, where a user selects the images 160 and 162 for processing by interacting with the GUI, as will be understood in view of this disclosure. For example, the user can select the images 160 and 162 by clicking on representations of those images in a user interface, thereby indicating which content image the user wishes to edit and which style image the user wishes to incorporate into the stylized image that results from the style transfer process. The images 160 and 162 can be stored, for example, in a database of images accessible to the user view the GUI 150.

The content image 160 and the style image 162 are then provided to the hierarchical scale matching module 140. The original resolutions of the content image 160 and the style image 162 can be any arbitrary resolution. For example, the resolution of the content image 160 can be 512 pixels, 1K pixels, 2K pixels, 4K pixels, or any other resolution. The resolution of the style image 162 can also be any arbitrary resolution, for example, 512 pixels, 1K pixel, 2K pixel, 4K pixels, or any other resolution. However, the resolution of the style image 162, as received, is not necessarily the same as the resolution of the content image 160, as received. As will be discussed below, the resolutions of the content image 160 and the style image 160 are matched at several different scale levels during processing.

Next, the style transfer module 142 partitions the downscaled content image into several patches and performs style transfer from the style image to the content image on a patch-by-patch basis. The result of the style transfer is a modified (stylized) content image, which is then fed back to the hierarchical scale matching module 140, where the unmodified (original but downscaled) content image, the modified (stylized but downscaled) content image, and the style image are upscaled. The upscaled images are then processed again by the style transfer module. This iterative process of upscaling and style transfer is repeated until the content image is at the same resolution as the original HR content image. The result is the stylized image 162, which also has the same resolution as the original HR content image.

Figure 5:
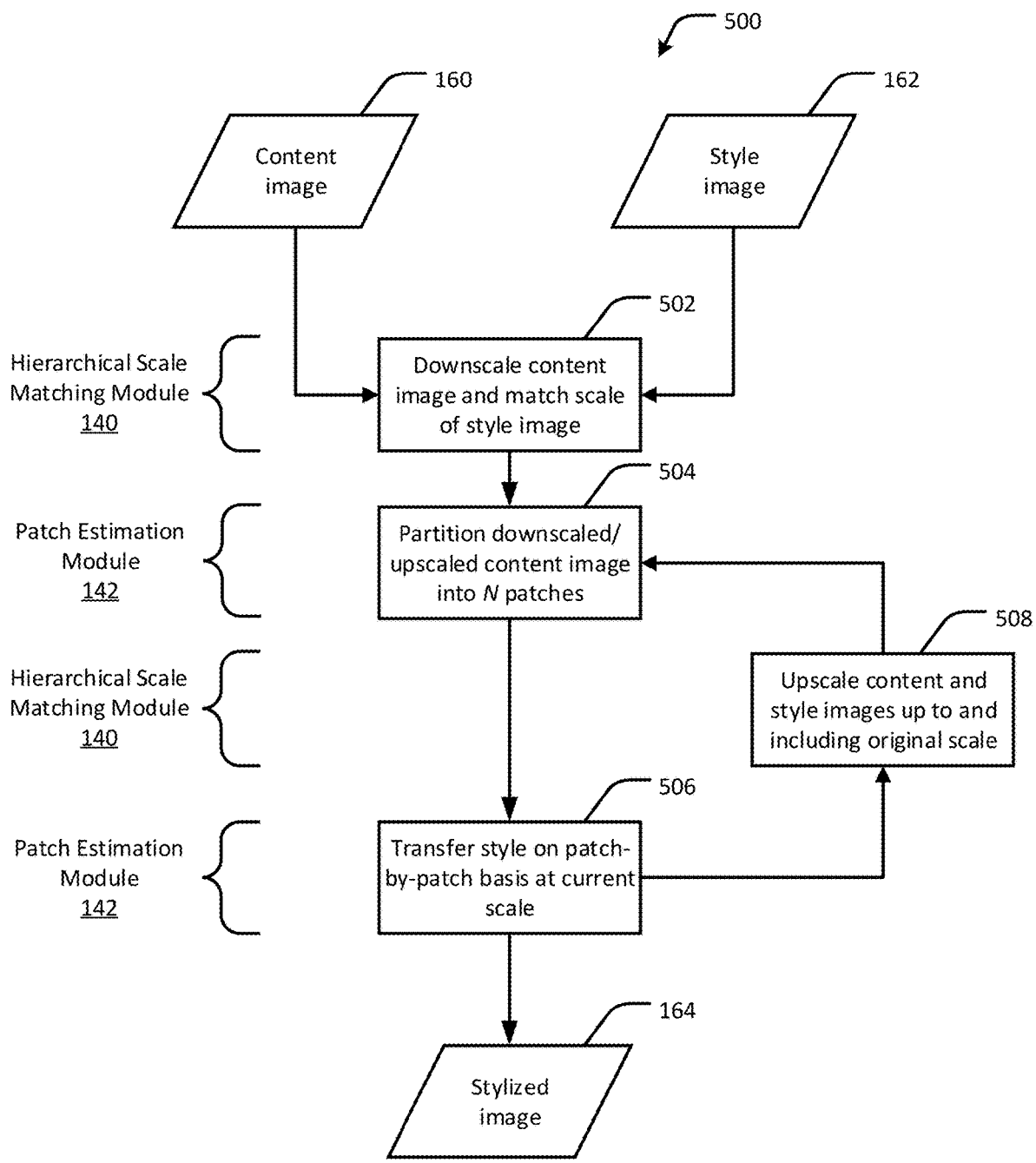
FIG. 5 is a flow diagram of an example methodology for transferring a style of a digital style image to a digital content image, in accordance with an embodiment of the present disclosure.

FIG. 5 is a flow diagram of an example methodology 500 associated with the system 400 of FIG. 4, in accordance with an embodiment of the present disclosure. The original resolution of the content image 160 is considered a HR image, and any resolution of the content image 160 that is lower than the original resolution is considered an LR image. The original, HR content image 160 has an arbitrary resolution. The hierarchical scale matching module 140 initially downscales 502 the HR content image to an LR image. For example, if the original resolution of the content image 160 is 4K pixels, then the hierarchical scale matching module 140 downscales the content image 160 to 515 pixels, 1K pixels, 2K pixels, or any resolution that is lower than 4K pixels. The scale level of the downscaled content image can be determined by user settings or automatically based on the original resolution and other factors such as the processing capabilities and available memory of the computing device 110.

The hierarchical scale matching module 140 further matches 502 the resolution of the style image 162 to the downscaled (LR) content image. For example, if the content image 160 is downscaled to 512 pixels and if the original resolution of the style image 162 is 4K pixels, then the hierarchical scale matching module 140 downscales the style image 162 to 512 pixels to match the resolution of the downscaled content image.

Next, the style transfer module 142 partitions 504 the downscaled content image into several patches and performs style transfer 506 from the style image to the content image on a patch-by-patch basis at the current scale. Note that the resolution of the content image is the same as the resolution of the style image during style transfer. Any suitable patch-based style transfer technique can be utilized at a given scale level, such as described by Li et al. in "Universal style transfer via feature transforms," Proceedings of the 31st Conference on Neural Information Processing Systems (NIPS), 2017, the entirety of which is incorporated into this disclosure by reference.

For example, style transfer 506 can be performed as an image reconstruction process coupled with feature transformation, such as whitening and coloring. The reconstruction inverts the features to the red-green-blue (RGB) color space. The feature transformation matches the statistics of a content image to a style image. For instance, the whitening and color transform generates a feature map from the content image. The whitening and color transform generates the feature map where a covariance matrix of the feature map matches a covariance matrix of a feature map of the style image. The whitening transform whitens the content feature map by applying a linear transformation to the content feature map, where the result of the transformation has an identity matrix as a covariance matrix. The color transform colors the result of the whitening transform by applying an inverse of the whitening linear transformation to generate the content feature map, which has a covariance matrix that matches the covariance matrix of the style feature map.

At this point, the downscaled content image has been modified by the patch-based style transfer. Next, the hierarchical scale matching module 140 upscales 508 both the original and modified (stylized) content images to a higher resolution, typically by a factor of two. For example, if the resolution of the downscaled content image is 512 pixels, the content image is upscaled to 1K pixels. If the downscaled content image is 1K pixels, the content image is upscaled to 2K pixels, and so forth. Note that while the content image can be upscaled by a factor of two, other upscaling factors can be used. The style image is also rescaled to match the current resolution of the content image. For example, if the content image is currently 1K pixels, then the style image is also scaled to 1K pixels.

Next, the style transfer module 142 partitions 504 the upscaled content image into several patches and again performs style transfer 506 from the style image to the content image on a patch-by-patch basis at the current resolution. The style transfer incorporates the modified (stylized) content image from the previous iteration of the style transfer (at the lower resolution) into the original (not stylized) content image to obtain coarse-to-fine results.

The above-described iterative process of upscaling 508 the content image, partitioning 504 the upscaled content image, and performing style transfer 506 at matching scales with the style image is repeated until the content image has been upscaled to its original resolution, at which a final style transfer 506 is performed using the original HR content image and the style image at the same resolution to produce the stylized image 162. For example, if the content image 160 has an original resolution of 4K pixels and is initially downscaled to 512 pixels, and if upscaling is performed by a factor of two, then style transfer occurs at 512 pixels, 1K pixels, 2K pixels, and finally at 4K pixels, at which the resulting stylized image 164 is obtained at the same (original) resolution of the content image 160. The stylized image 162 has the same resolution as the original HR content image.

Figure 6:
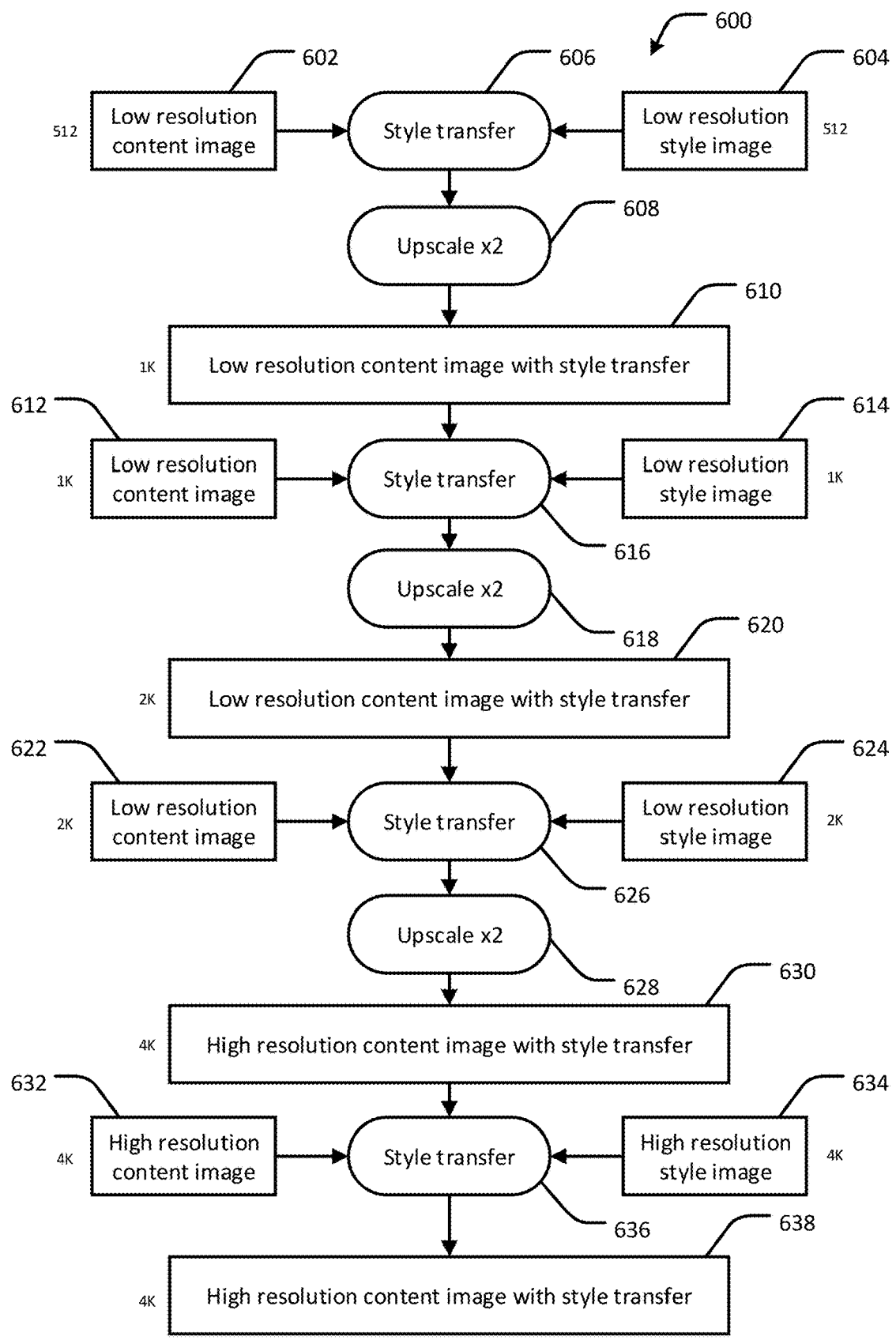
FIG. 6 is a flow diagram of another example methodology for transferring a style of a digital style image to a digital content image, in accordance with an embodiment of the present disclosure.

FIG. 6 is a flow diagram of an example methodology 600 that shows the iterative nature of the process in further detail, in accordance with an embodiment of the present disclosure. Initially, style transfer 606 is performed using a LR content image 602 and a LR style image 604 at a first resolution. As noted above, the resolution of the LR content image 602 is the same as the resolution of the LR style image 604; in this example, the current resolution is 512 pixels for both images. The style transfer 606 is performed using any suitable style transfer technique, including a patch-by-patch feature whitening and coloring technique, such as described by Li et al., at the current resolution of the content and style images.

The result of the style transfer 606 at the first resolution is a stylized content image at the first resolution, which is then upscaled 608 by a suitable upscaling factor to a LR content image 610 at a second resolution; in this example, the image is upscaled by a factor of two to 1K pixels (LR in the sense that the stylized content image has a lower resolution than the original content image). After upscaling the stylized content image, it is combined with the original content image 612 at the second resolution; in this example, the resolution of the stylized content image, the original content image, and the style image are all scaled to 1K pixels. The combining includes linearly combining the stylized content image with the original content image at the same scale levels. Then, style transfer 616 is performed on a patch-by-patch basis using the upscaled stylized content image 610, the original content image 612, and the style image 614 at the current resolution.

The result of the style transfer 616 at the second resolution is a stylized content image at the second resolution, which is again upscaled 618 by a suitable upscaling factor to another LR content image 620 at a third resolution; in this example, the image is upscaled by a factor of two to 2K pixels (LR again in the sense that the stylized content image still has a lower resolution than the original content image). After upscaling the stylized content image, it is combined with the original content image 622 at the same resolution; in this example, the resolution of the stylized content image, the original content image, and the style image are all scaled to 2K pixels. Then, style transfer 626 is performed on a patch-by-patch basis using the upscaled stylized content image 620, the original content image 622, and the style image 624 at the current resolution.

The result of the style transfer 626 at the third resolution is a stylized content image at the third resolution, which is yet again upscaled 628 by a suitable upscaling factor to an HR content image 630; in this example, the image is upscaled by a factor of two to 4K pixels (now considered HR in the sense that the stylized content image has the same resolution as the original content image). After upscaling the stylized content image, it is combined with the original content image 632 at the same resolution; in this example, the resolution of the stylized content image, the original content image, and the style image are all scaled to 4K pixels. Then, style transfer 636 is performed a final time on a patch-by-patch basis using the upscaled stylized content image 630, the original content image 632, and the style image 634 at the current resolution. This produces a stylized image 638 at the same resolution as the original content image.

By using hierarchical scale matching between the content image and the style image in combination with a patch-based style transfer technique, while using the result of each style transfer as an input to successive iterations of the process at increasing resolutions, images with arbitrary resolutions can be processed using fewer computing resources (for example, less processing time and/or less memory) to achieve visually pleasing results. This is because the disclosed hierarchical scale matching, patch-based style transfer techniques estimate the covariance matrix of the HR image in feature space. For example, after splitting a relatively high-resolution image into N patches, the corresponding features can be obtained. The features f of the original HR content image and the features of each patch $[f_1, f_2, \ldots, f_N]$ of the content image can be used to estimate the feature mean $f_{mean}$. To estimate $f_{mean}$, the means (averages) of the features of each LR patch are calculated as follows:

$$\frac{1}{NX}\sum_{x=1}^{NX} f^{(x)} = f_{mean} = \frac{1}{NX}\sum_{n=1}^{N}\sum_{x=1}^{X} f_n^{(x)}$$

Then, the means are subtracted as follows:

$$f \leftarrow f - f_{mean}$$

$$[f_1, f_2, \ldots, f_N] \leftarrow [f_1 - f_{mean}, f_2 - f_{mean}, \ldots, f_N - f_{mean}]$$

The covariance matrix can be calculated as follows:

$$\frac{1}{NX-1} ff^T =$$

$$\frac{1}{NX-1}[f_1, f_2, \ldots, f_N][f_1, f_2, \ldots, f_N]^T = \frac{1}{NX-1}\sum_{n=1}^{N} f_n f_n^T$$

Computing Device

Figure 7:
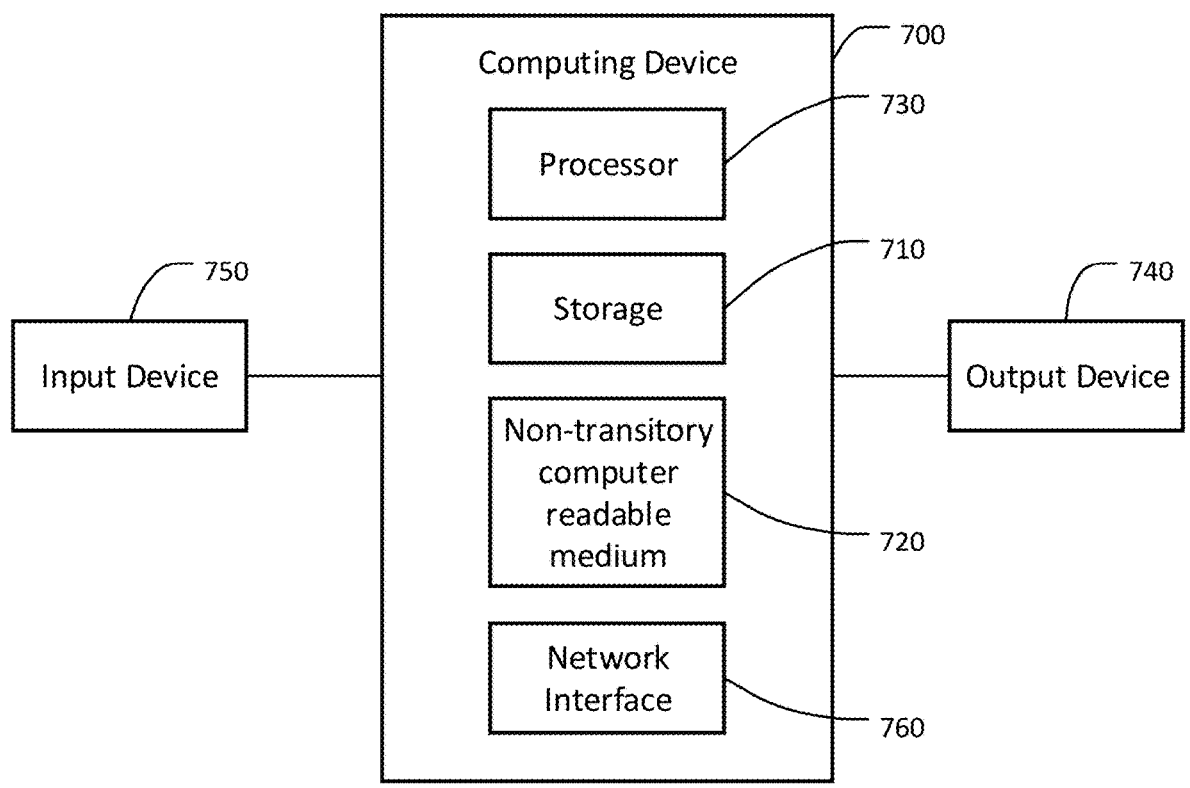
FIG. 7 is a block diagram representing an example computing device or system that may be used to perform any of the techniques as variously described in this disclosure.

FIG. 7 is a block diagram representing an example computing device 700 that may be used to perform any of the techniques as variously described in this disclosure. For example, the system 100 of FIG. 1, or any portions thereof, the system 400 of FIG. 4, or any portions thereof, and the methodologies of FIGS. 5 and 6, or any portions thereof, may be implemented in the computing device 700. The computing device 700 may be any computer system, such as a workstation, desktop computer, server, laptop, handheld computer, tablet computer (e.g., the iPad® tablet computer), mobile computing or communication device (e.g., the iPhone® mobile communication device, the Android™ mobile communication device, and the like), VR device or VR component (e.g., headset, hand glove, camera, treadmill, etc.) or other form of computing or telecommunications device that is capable of communication and that has sufficient processor power and memory capacity to perform the operations described in this disclosure. A distributed computational system may be provided including a plurality of such computing devices.

The computing device 700 includes one or more storage devices 710 or non-transitory computer-readable media 720 having encoded thereon one or more computer-executable instructions or software for implementing techniques as variously described in this disclosure. The storage devices 710 may include a computer system memory or random access memory, such as a durable disk storage (which may include any suitable optical or magnetic durable storage device, e.g., RAM, ROM, Flash, USB drive, or other semiconductor-based storage medium), a hard-drive, CD-ROM, or other computer readable media, for storing data and computer-readable instructions or software that implement various embodiments as taught in this disclosure. The storage device 710 may include other types of memory as well, or combinations thereof. The storage device 710 may be provided on the computing device 700 or provided separately or remotely from the computing device 700. The non-transitory computer-readable media 720 may include, but are not limited to, one or more types of hardware memory, non-transitory tangible media (for example, one or more magnetic storage disks, one or more optical disks, one or more USB flash drives), and the like. The non-transitory computer-readable media 720 included in the computing device 700 may store computer-readable and computer-executable instructions or software for implementing various embodiments. The computer-readable media 720 may be provided on the computing device 700 or provided separately or remotely from the computing device 700.

The computing device 700 also includes at least one processor 730 for executing computer-readable and computer-executable instructions or software stored in the storage device 710 or non-transitory computer-readable media 720 and other programs for controlling system hardware. Virtualization may be employed in the computing device 700 so that infrastructure and resources in the computing device 700 may be shared dynamically. For example, a virtual machine may be provided to handle a process running on multiple processors so that the process appears to be using only one computing resource rather than multiple computing resources. Multiple virtual machines may also be used with one processor.

A user may interact with the computing device 700 through an output device 740, such as a screen or monitor, including an augmented reality display device, which may display one or more user interfaces provided in accordance with some embodiments. The output device 740 may also display other aspects, elements or information or data associated with some embodiments. The computing device 700 may include other I/O devices 750 for receiving input from a user, for example, a keyboard, a joystick, a game controller, a pointing device (e.g., a mouse, a user's finger interfacing directly with a touch-sensitive display device, etc.), or any suitable user interface, including an AR headset. The computing device 700 may include other suitable conventional I/O peripherals. The computing device 700 includes or is operatively coupled to various suitable devices for performing one or more of the aspects as variously described in this disclosure.

The computing device 700 may run any operating system, such as any of the versions of Microsoft® Windows® operating systems, the different releases of the Unix® and Linux® operating systems, any version of the MacOS® for Macintosh computers, any embedded operating system, any real-time operating system, any open source operating system, any proprietary operating system, any operating systems for mobile computing devices, or any other operating system capable of running on the computing device 100 or 300 and performing the operations described in this disclosure. In an embodiment, the operating system may be run on one or more cloud machine instances.

In other embodiments, the functional components/modules may be implemented with hardware, such as gate level logic (e.g., FPGA) or a purpose-built semiconductor (e.g., ASIC). Still other embodiments may be implemented with a microcontroller having several input/output ports for receiving and outputting data, and several embedded routines for carrying out the functionality described in this disclosure. In a more general sense, any suitable combination of hardware, software, and firmware can be used, as will be apparent.

As will be appreciated in light of this disclosure, the various modules and components of the system, such as the Hierarchical Scale Matching Module 130, the Style Transfer Module 142, the GUI 150, or any combination of these, is implemented in software, such as a set of instructions (e.g., HTML, XML, C, C++, object-oriented C, JavaScript®, Java®, BASIC, etc.) encoded on any computer readable medium or computer program product (e.g., hard drive, server, disc, or other suitable non-transitory memory or set of memories), that when executed by one or more processors, cause the various methodologies provided in this disclosure to be carried out. It will be appreciated that, in some embodiments, various functions and data transformations performed by the user computing system, as described in this disclosure, can be performed by similar processors or databases in different configurations and arrangements, and that the depicted embodiments are not intended to be limiting. Various components of this example embodiment, including the computing device 100 or 300, may be integrated into, for example, one or more desktop or laptop computers, workstations, tablets, smart phones, game consoles, set-top boxes, or other such computing devices. Other componentry and modules typical of a computing system, such as processors (e.g., central processing unit and coprocessor, graphics processor, etc.), input devices (e.g., keyboard, mouse, touch pad, touch screen, etc.), and operating system, are not shown but will be readily apparent.

Numerous embodiments will be apparent in light of the present disclosure, and features described herein can be combined in any number of configurations. One example embodiment provides a computer-implemented method, in a digital medium environment, for editing digital images, a computer-implemented method of transferring a style from one digital image to another digital image. The method includes segmenting, by at least one processor of a computing device, an original digital content image at a first content scale into a first plurality of patches at the first content scale, wherein the first content scale is lower than an original scale of the original digital content image; transferring, by the at least one processor, a style of a digital style image at a first style scale to each of the patches of the original digital content image at the first content scale, thereby providing a first modified digital content image at the first content scale; upscaling, by the at least one processor, the first modified digital content image from the first content scale to a second content scale, the second content scale being greater than the first content scale; combining, by the at least one processor, the original digital content image at the second scale with the first modified digital content image at the second scale; segmenting, by the at least one processor, the combined digital content image at the second content scale into a second plurality of patches at the second content scale; transferring, by the at least one processor, the style of the digital style image at a second style scale to each of the patches of the combined digital content image at the second content scale, the second style scale being the same as the first style scale, thereby providing a second modified digital content image at the second content scale; and causing, by the at least one processor, display of an output image with content of the second modified digital content image at the second content scale in the style of the digital style image. In some cases, transferring the style of the digital style image at either or both of the first and second content scales to each of the first and second patches, respectively, includes performing whitening and coloring transforms on the respective ones of the first and second patches. In some cases, the whitening transform includes applying a first linear transformation to a content feature map of each of the respective first and second patches, wherein the coloring transform includes applying a second linear transformation to the results of the whitening transform, wherein the first linear transformation is determined from a decomposition of a covariance matrix of the content feature map, and wherein the second linear transformation is determined from a decomposition of a covariance matrix of a style feature map. In some such cases, the covariance matrix of the content feature map is based on a mean of features in each of the first and second patches, respectively. In some cases, combining the digital content image at the second scale with the modified digital content image at the second scale includes performing a linear combination of the digital content image at the second scale with the modified digital content image at the second scale. In some cases, the method includes repeating the upscaling, combining, segmenting, and transferring at a third content scale and a third style scale, wherein the third content scale and the third style scale are each the same as the original scale of the original digital content image. In some cases, the second content scale is greater than the first content scale by a factor of two. Another example embodiment provides a non-transitory computer program product having instructions encoded thereon that when executed by one or more computer processors cause the one or more computer processors to perform a process such as set forth in this paragraph.

Another example embodiment provides a system for transferring a style from one digital image to another digital image. The system includes a storage and a processor operatively coupled to the storage, the processor configured to execute instructions stored in the storage that when executed cause the processor to carry out a process. The process includes segmenting an original digital content image at a first content scale into a first plurality of patches at the first content scale, wherein the first content scale is lower than an original scale of the original digital content image; transferring a style of a digital style image at a first style scale to each of the patches of the original digital content image at the first content scale, thereby providing a first modified digital content image at the first content scale; upscaling the first modified digital content image from the first content scale to a second content scale, the second content scale being greater than the first content scale; combining the original digital content image at the second scale with the first modified digital content image at the second scale; segmenting the combined digital content image at the second content scale into a second plurality of patches at the second content scale; transferring the style of the digital style image at a second style scale to each of the patches of the combined digital content image at the second content scale, the second style scale being the same as the first style scale, thereby providing a second modified digital content image at the second content scale; and causing display of an output image with content of the second modified digital content image at the second content scale in the style of the digital style image. In some cases, transferring the style of the digital style image at either or both of the first and second content scales to each of the first and second patches, respectively, includes performing whitening and coloring transforms on the respective ones of the first and second patches. In some cases, the whitening transform includes applying a first linear transformation to a content feature map of each of the respective first and second patches, wherein the coloring transform includes applying a second linear transformation to the results of the whitening transform, wherein the first linear transformation is determined from a decomposition of a covariance matrix of the content feature map, and wherein the second linear transformation is determined from a decomposition of a covariance matrix of a style feature map. In some cases, the covariance matrix of the content feature map is based on a mean of features in each of the first and second patches, respectively. In some cases, combining the digital content image at the second scale with the modified digital content image at the second scale includes performing a linear combination of the digital content image at the second scale with the modified digital content image at the second scale. In some cases, the process further includes repeating the upscaling, combining, segmenting, and transferring at a third content scale and a third style scale, wherein the third content scale and the third style scale are each the same as the original scale of the original digital content image. In some cases, the second content scale is greater than the first content scale by a factor of two.

The foregoing description and drawings of various embodiments are presented by way of example only. These examples are not intended to be exhaustive or to limit the invention to the precise forms disclosed. Alterations, modifications, and variations will be apparent in light of this disclosure and are intended to be within the scope of the invention as set forth in the claims.

What is claimed is:

1. In a digital medium environment for editing digital images, a computer-implemented method of transferring a style from one digital image to another digital image, the method comprising:
dividing an original digital content image into a plurality of patches, at least one of the patches associated with a content feature map;
transferring a style of a digital style image to the at least one of the patches of the original digital content image based on a covariance matrix of the content feature map of the at least one of the patches, wherein the content feature map is a function of means of features of each of at least two of the patches, thereby providing a modified digital content image;
combining the original digital content image with the modified digital content image to produce a combined digital content image; and
causing display of an output image with content of the combined digital content image in the style of the digital style image.

2. The method of claim 1, further comprising upscaling the digital style image from a first style scale to a second style scale, the second style scale being different from the first style scale, wherein the style of the digital style image is transferred to the at least one of the patches of the original digital content image at the second style scale.

3. The method of claim 2, wherein the second style scale of the digital style image is the same as a content scale of the original digital content image.

4. The method of claim 1, wherein transferring the style of the digital style image to the at least one of the patches includes performing whitening and coloring transforms on the at least one patch, and wherein the whitening transform includes applying a first linear transformation to the content feature map of the at least one patch, wherein the coloring transform includes applying a second linear transformation to the results of the whitening transform, wherein the first linear transformation is determined from a decomposition of the covariance matrix of the content feature map, and wherein the second linear transformation is determined from a decomposition of a covariance matrix of a style feature map.

5. The method of claim 1, wherein combining the original digital content image with the modified digital content image includes performing a linear combination of the digital content image with the modified digital content image.

6. The method of claim 1, wherein the transferring is performed at a first style scale of the digital style image, and wherein the method further comprises repeating the transferring at a second style scale, wherein the second style scale is the same as an original content scale of the original content image.

7. A computer program product including one or more non-transitory machine-readable mediums having instructions encoded thereon that when executed by at least one processor causes a process to be carried out for transferring a style from one digital image to another digital image, the process comprising:
dividing an original digital content image into a plurality of patches, at least one of the patches associated with a content feature map;
transferring a style of a digital style image to the at least one of the patches of the original digital content image based on a covariance matrix of the content feature map of the at least one of the patches, wherein the content feature map is a function of means of features of each of at least two of the patches, thereby providing a modified digital content image;
combining the original digital content image with the modified digital content image to produce a combined digital content image; and
causing display of an output image with content of the combined digital content image in the style of the digital style image.

8. The computer program product of claim 7, wherein the process further comprises upscaling the digital style image from a first style scale to a second style scale, the second style scale being different from the first style scale, wherein the style of the digital style image is transferred to the at least one of the patches of the original digital content image at the second style scale.

9. The computer program product of claim 8, wherein the second style scale of the digital style image is the same as a content scale of the original digital content image.

10. The computer program product of claim 7, wherein transferring the style of the digital style image to the at least one of the patches includes performing whitening and coloring transforms on the at least one patch, and wherein the whitening transform includes applying a first linear transformation to the content feature map of the at least one patch, wherein the coloring transform includes applying a second linear transformation to the results of the whitening transform, wherein the first linear transformation is determined from a decomposition of the covariance matrix of the content feature map, and wherein the second linear transformation is determined from a decomposition of a covariance matrix of a style feature map.

11. The computer program product of claim 7, wherein combining the original digital content image with the modified digital content image includes performing a linear combination of the digital content image with the modified digital content image.

12. A system for transferring a style from one digital image to another digital image, the system comprising:
a means for dividing an original digital content image into a plurality of patches, at least one of the patches associated with a content feature map;
a means for transferring a style of a digital style image to the at least one of the patches of the original digital content image based on a covariance matrix of the content feature map of the at least one of the patches, wherein the content feature map is a function of means of features of each of at least two of the patches, thereby providing a modified digital content image;
a means for combining the original digital content image with the modified digital content image to produce a combined digital content image; and
a means for causing display of an output image with content of the combined digital content image in the style of the digital style image.

13. The system of claim 12, further comprising a means for upscaling the modified digital content image from a first content scale to a second content scale, and/or upscaling the digital style image from a first style scale to a second style scale, wherein the style of the digital style image is transferred to the at least one of the patches of the original digital content image at the second content scale and/or at the second style scale.

14. The system of claim 12, wherein the means for transferring the style of the digital style image includes performing whitening and coloring transforms on the patches.

15. The system of claim 14, wherein the whitening transform includes applying a first linear transformation to a content feature map of the at least one of the patches, wherein the coloring transform includes applying a second linear transformation to the results of the whitening transform, wherein the first linear transformation is determined from a decomposition of a covariance matrix of the content feature map, and wherein the second linear transformation is determined from a decomposition of a covariance matrix of a style feature map.

16. The system of claim 12, wherein the means for combining the digital content image with the modified digital content image includes performing a linear combination of the digital content image with the modified digital content image.

17. The system of claim 12, further comprising a means for repeating the transferring and combining at a content scale and a style scale, at least one of which is the same as an original scale of the original digital content image.

* * * * *